P. MACGAHAN.
ELECTRICAL MEASURING INSTRUMENT.
APPLICATION FILED JULY 11, 1914.

1,289,503.

Patented Dec. 31, 1918.
2 SHEETS—SHEET 1.

WITNESSES:
Fred A. Lind
J. A. Procter

INVENTOR
Paul MacGahan
BY
Wesley L. Carr
ATTORNEY

P. MacGAHAN.
ELECTRICAL MEASURING INSTRUMENT.
APPLICATION FILED JULY 11, 1914.

1,289,503.

Patented Dec. 31, 1918.
2 SHEETS—SHEET 2.

WITNESSES:
Fred A. Lind.
J H Procter

INVENTOR
Paul MacGahan
BY
Wesley E. Carr
ATTORNEY

UNITED STATES PATENT OFFICE.

PAUL MacGAHAN, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRICAL MEASURING INSTRUMENT.

1,289,503.

Specification of Letters Patent.

Patented Dec. 31, 1918.

Application filed July 11, 1914. Serial No. 850,329.

*To all whom it may concern:*

Be it known that I, PAUL MACGAHAN, a citizen of the United States, and a resident of Pittsburgh, in the county of Allegheny and State of Pennsylvania, have invented a new and useful Improvement in Electrical Measuring Instruments, of which the following is a specification.

My invention relates to electrical measuring instruments and particularly to graphic instruments employed to record the total value of the indications of a plurality of electrical meters.

One object of my invention is to provide a flexible means for so connecting the movable members of an instrument, of the above indicated type, that the same will not bind or restrain the operation of the instrument.

Another object of my invention is to provide means for so adjusting the calibration of an instrument that the total value of the indications of any number of a plurality of meters, embodied therein, may be recorded on a record sheet with maximum scale divisions.

I have provided a plurality of electrical meters or devices which are severally connected to different sources of energy. I have provided also a single flexible means for so connecting the movable members of the several measuring devices that an indication of the total energy measured by any number of the devices may be registered. In order that a full-scale indication may be had when several of the devices are out of service, I have provided a means for simultaneously changing the resistance or the multiplier of the several devices. By this means, I decrease the indication of each of the devices an equal amount when all of the devices or meters are in use, and I so adjust the multipliers of the several devices, when a less number are in use that the maximum indication will be recorded upon the same size record sheet, with an increased value for the division of the scale of the same.

Figure 1:
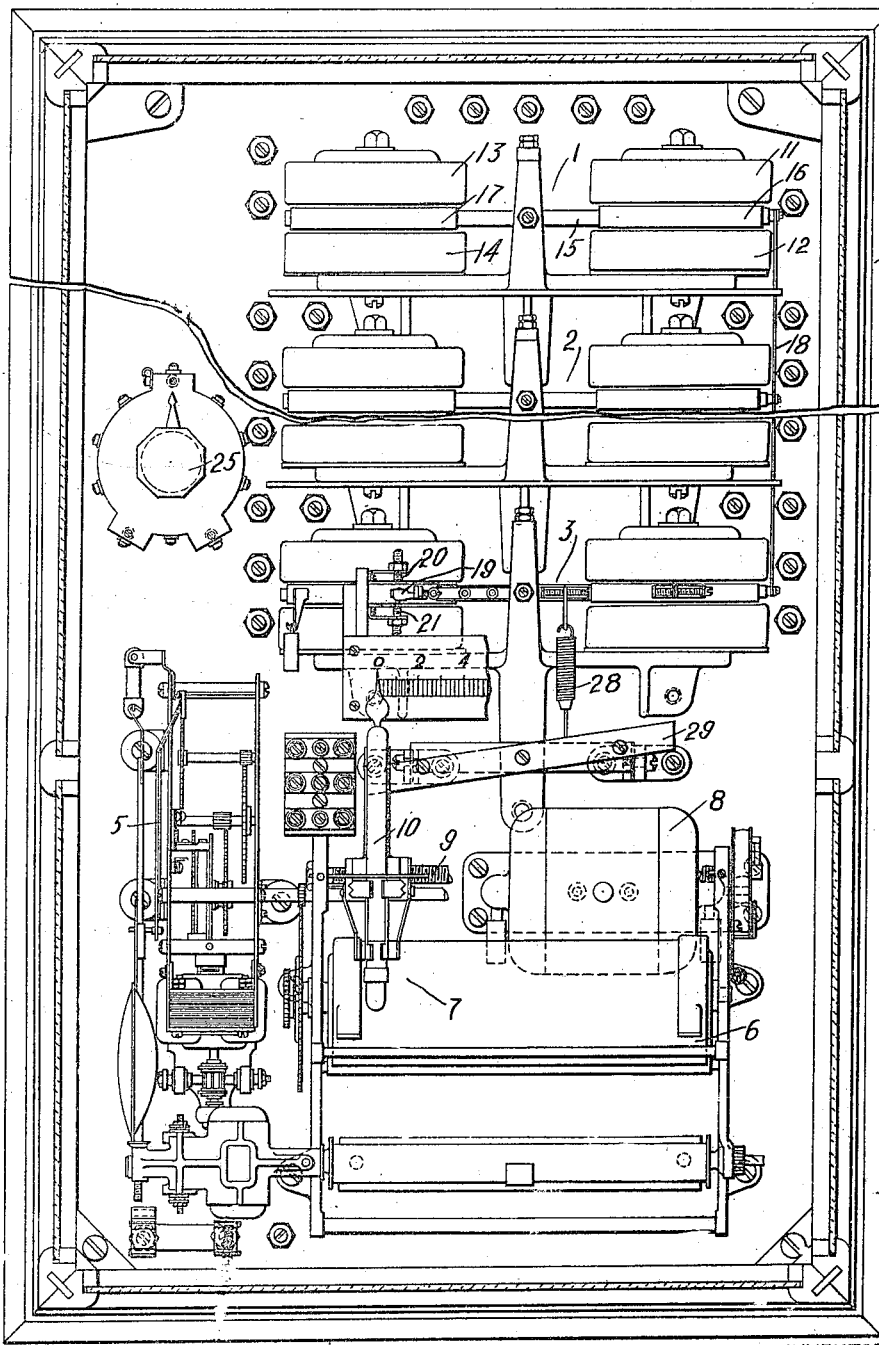
Figure 3:
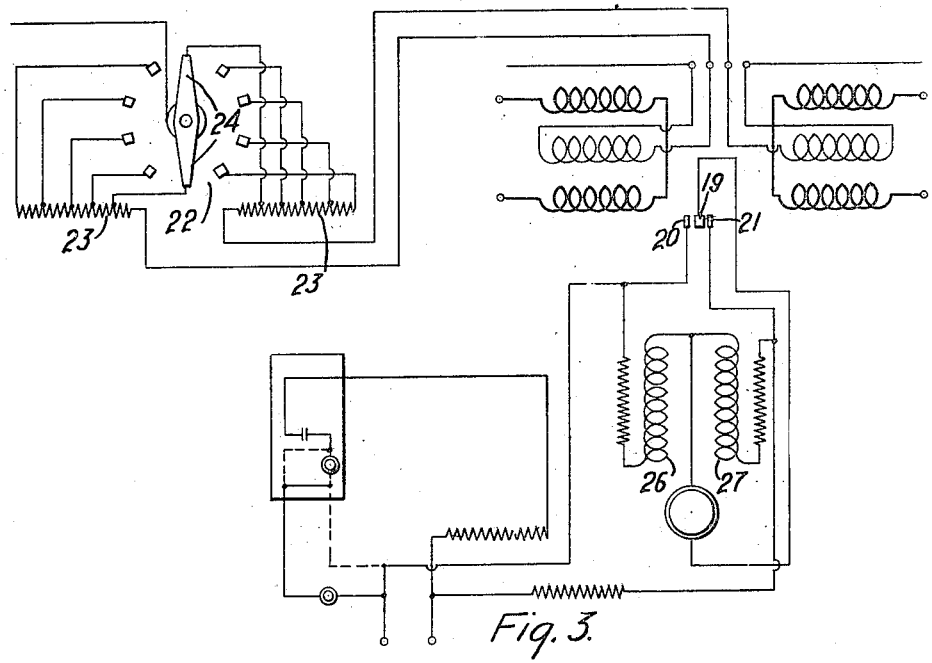
Figure 2:
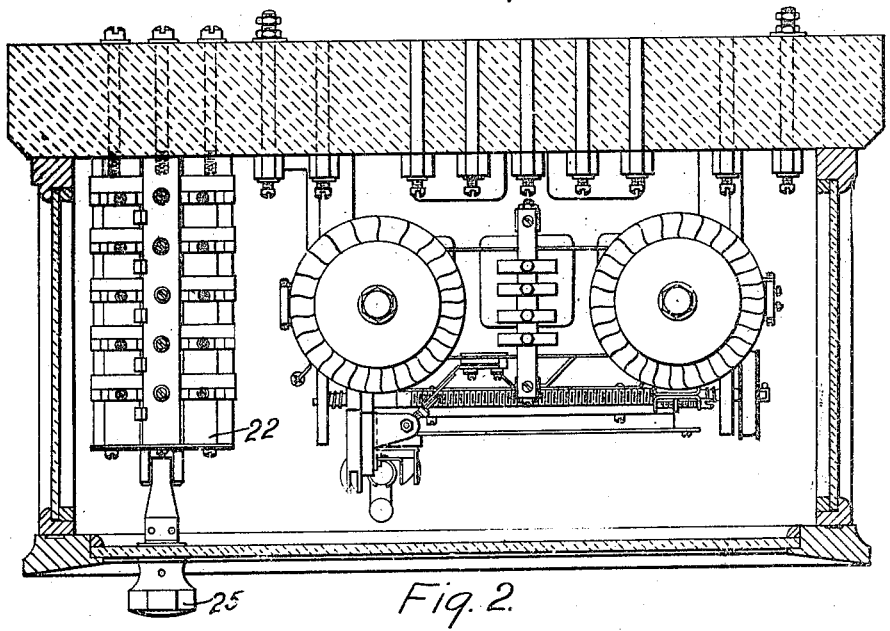

In the accompanying drawings, Figure 1 is a fragmentary front view, shown partially in section and partially in elevation, of an electrical measuring instrument embodying my invention; Fig. 2 is a top view, shown partially in plan and partially in section, of the device shown in Fig. 1; Fig. 3 is a diagrammatic view of circuits and apparatus embodied in my invention.

A plurality of Kelvin balances or electrodynamometers 1, 2 and 3 are mounted in a casing 4, as shown in the drawings. A clock 5, which is wound by an electric motor, is provided for advancing the record sheet 6 of a recording device 7, at recurrent intervals. A motor 8 is provided for operating a screw shaft 9 upon which is operatively mounted a marking device 10.

The balances 1, 2 and 3 severally comprise four stationary coils 11, 12, 13, and 14, a pivotally mounted member 15 and two movable coils 16 and 17, which are severally mounted upon the end portions of the pivotally mounted member 15. The movable coils 16 and 17 are operatively disposed between the stationary coils 11 and 12 and 13 and 14, respectively.

The pivotally mounted members 15 of the balances 1, 2 and 3 are operatively connected together by a single flexible member 18. One of the pivotally mounted members 15 has attached thereto a movable contact member 19 which coöperates with two stationary contact terminals 20 and 21, for reasons hereinafter set forth.

A rheostat 22 is provided with a plurality of variable-resistance resistors 23, a plurality of movable contact members 24 and a single operating knob 25. The resistors, of which there are as many as there are balances or electro-dynamometers in the instrument, are severally connected in circuit with the movable coils of the balances. Thus, when the resistance in circuit with one of the balances is changed, the resistance in circuit with each of the balances is changed an equal amount.

A motor 8 is provided with two oppositely connected field windings 26 and 27 which are electrically connected to the stationary contact terminals 20 and 21, respectively, for reasons hereinafter set forth.

The operation of the Kelvin balance, as shown in the accompanying drawings, is well understood by those skilled in the art and it will, therefore, be sufficient to say that there are two forces tending to move the pivotally mounted members 15 in opposite directions, namely, the force due to the attraction of the coils and the force due to a control spring 28, which is connected, at one end, to one of the pivotally mounted members 15 and, at its other end, to a cam device 29. The total force of the attraction of the coils is proportional to the current and voltage or the energy to be measured, hence, the members 15 tend to move in one direction when the energy decreases, and in the opposite direction when it increases. If the energy in the several balances is different, a resultant force will be exerted. If the current in any of the balances changes, the resultant force of the several balances will be changed and the movable contact member 19 will engage one of the contact members 20 and 21, depending upon whether or not the change in the current is an increase or a decrease in value. When the contact member 19 engages one of the stationary contact terminals, the motor 8 is supplied with current and rotates in a predetermined direction. The rotation of the motor 8 operates the screw shaft 9 to move the marking device 10. As the marking device 10 moves along the screw shaft 9, the cam device 29 is either raised or lowered, depending upon the direction of travel of the device 10, to vary the tension of the spring 28. When the change in force in the balances is balanced by the tension of the spring 28, the contact member 19 becomes disengaged from the contact terminals 20 and 21, and the motor 8 ceases to operate.

The flexible member 18 is attached to one end of each of the pivoted members 15 in order to prevent any binding or restraining of the balances. It is essential that the balances be connected together by one flexible strip, since no accurate adjustments are necessary in assembling the instrument, when it is so connected.

If all of the balances are not in operation, the maximum width of the record produced upon the sheet 6 will vary, according to the number of balances operating. It is advisable, in order to prevent the scale on the record sheet from being too small, when only a few of the devices are operating, to so adjust the rheostat 22 that the resultant forces will operate the recording device to produce a record having maximum scale divisions. The rheostat may be adjusted by rotating the knob 25 until resultant relative forces are sufficiently changed to produce a record having scale divisions which are substantially inversely proportional to the number of balances in operation. Thus, it will be seen that, by adjusting the rheostat 22, the value of the scale divisions upon the record sheet 6 may be so changed as to provide a readable record for any number of balances that are operated. Paper charts or record sheets printed to suit the proper constant of the instrument may in each case, be substituted, if desired, to avoid the use of a multiplying constant in reading the scale deflections.

The resistors of the rheostat 22 are divided into various units and connected to contact terminals, substantially as shown in Fig. 3 of the drawings. When the movable contact members 24 are rotated, by rotating the knob 25, the resistance in the resistors connected in circuit with the movable coils 16 and 17 is changed. This, of course, occurs in all of the balances simultaneously.

My invention is not limited to the particular construction illustrated, but is capable of various modifications within the scope of the appended claims.

I claim as my invention:

1. In an electrical measuring instrument, the combination with a plurality of Kelvin-balance instruments connected to independent electric circuits, of a single means for flexibly connecting the movable members of the said instruments together to produce a resultant force.

2. In an electrical measuring instrument, the combination with a plurality of Kelvin-balance instruments connected to independent electric circuits, of a single means for flexibly connecting the movable members of the said instruments together to produce a resultant force equivalent to the sum of the forces of the said balances.

3. In an electrical measuring instrument, the combination with a plurality of electro-responsive devices, and means for recording the indications of the same, of means for changing the value of the scale divisions of the record produced by the said plurality of devices in inverse proportion to the number of the said devices operating.

4. In an electrical measuring instrument, the combination with a plurality of electro-responsive devices, of a plurality of variable-resistance resistors operatively connected in circuit with the said electro-responsive devices, and means for simultaneously changing the resistance in the said resistors.

5. In an electrical measuring instrument, the combination with a plurality of Kelvin balances having coöperating stationary and movable windings, of a single flexible means for non-bindingly connecting the movable windings to produce a resultant force.

6. In an electrical measuring instrument, the combination with a plurality of electrical meters, of a plurality of variable-resistance resistors connected in circuit with the said plurality of electrical meters, and a single means for adjusting the value of the resistance of the same resistors.

7. In an electrical measuring instrument, the combination with a plurality of electrical meters, of a flexible means for operatively connecting the movable members of said meters, means for recording the total energy measured by the said meters, and means for changing the value of the scale divisions of the record thus produced, in substantial proportion to the number of meters operating.

8. In an electrical measuring instrument, the combination with a plurality of stationary coils, a plurality of pivotally mounted non-restrained members, and a plurality of movable coils mounted upon said pivotally mounted members, of means connected to one end of each of said pivotally mounted members for flexibly connecting the same together.

9. In an electrical measuring instrument, the combination with a plurality of stationary coils, a plurality of pivotally mounted members, and a plurality of movable coils mounted upon said pivotally mounted members, of means connected to one end of each of said pivotally mounted members for flexibly connecting the same together, a plurality of variable-resistance resistors, and a single means for changing the value of the resistance of the said resistors which is connected in circuit with each of the said movable members.

10. In a totalizing measuring instrument, the combination with a plurality of Kelvin-balance meters connected to independent electric circuits, of a single recording device, and mechanical means connected between the recording device and the balances for effecting the operation of the recording device in accordance with the totalized forces of the said balances.

11. In a totalizing instrument, the combination with a plurality of Kelvin-balance meters connected to independent sources of energy, of an actuated device, and mechanical means connected between the Kelvin-balances and the actuated device for effecting the operation of the actuated device in accordance with the totalized forces of the said balances.

12. In an electrical measuring instrument, the combination with a plurality of Kelvin-balance meters, of means connected to one end of the movable members of the meters for flexibly connecting the same together.

13. In an electrical measuring instrument, the combination with a plurality of unrestrained meters connected directly to independent electric circuits, of a single indicating device, and mechanical means for operatively connecting the meters to the indicating device.

14. In an electrical measuring instrument, the combination with a plurality of meters, and a single means for recording the totalized indications of the same, of non-automatic means for so changing the value of the scale divisions of the record produced that they will be inversely proportional to the number of meters operating.

15. In an electrical measuring instrument, the combination with a plurality of meters, and means for recording the indications of the same, of non-automatic means for so decreasing the value of the scale divisions of the record produced by the said plurality of meters that they will vary in value in accordance with the number of meters operating.

16. In an electrical measuring instrument, the combination with a plurality of unrestrained Kelvin balance wattmeters connected directly to independent electric circuits, of a single means for flexibly connecting the movable members of the said instruments together to produce a resultant force.

17. In an electrical measuring instrument, the combination with a plurality of unrestrained meters connected directly to independent electric circuits, of a single indicating device, and a single flexible means for operatively connecting the meters to the indicating device.

In testimony whereof, I have hereunto subscribed my name this 30th day of June, 1914.

PAUL MacGAHAN.

Witnesses:
BENJAMIN H. SMITH,
B. B. HINES.